March 22, 1966  N. G. OLSEN  3,241,460
HYDRAULIC PISTON WITH MECHANICAL UNLOADING VALVE
Filed Sept. 30, 1963
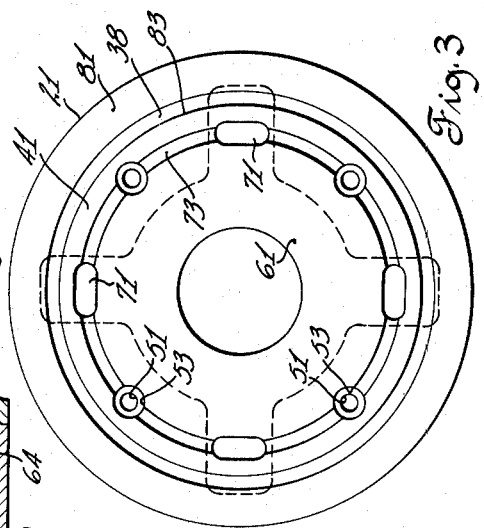
Fig. 3
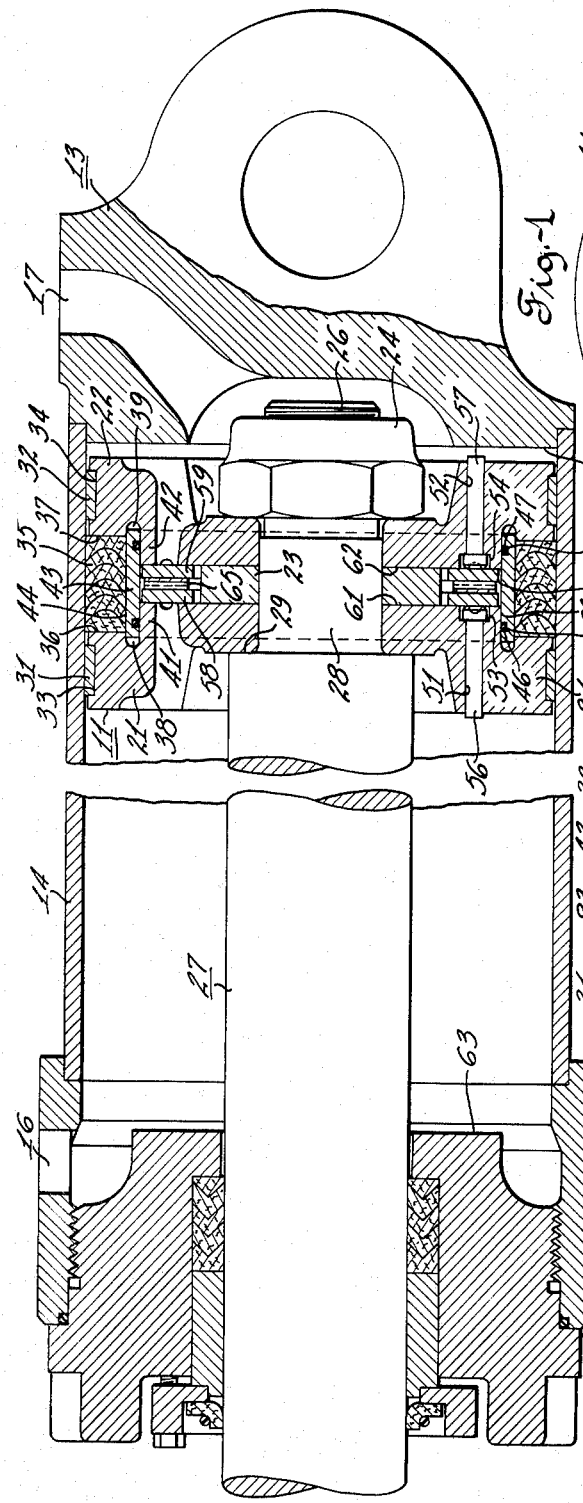
Fig. 1
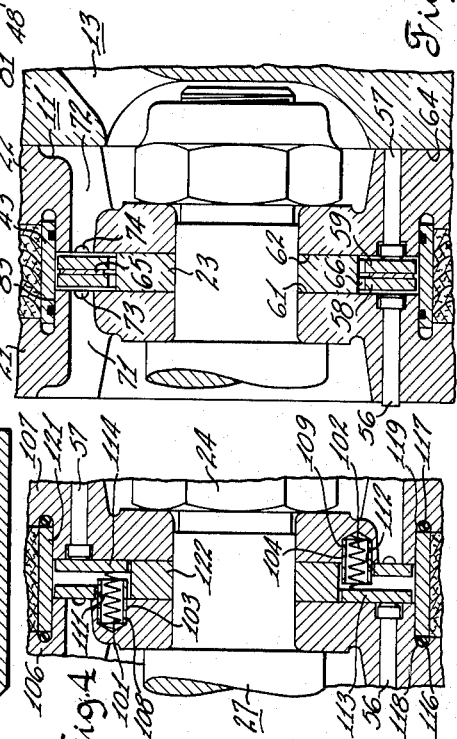
Fig. 2
Fig. 4
Inventor
Norman G. Olsen
By Charles L. Schwab
Attorney

United States Patent Office 3,241,460
Patented Mar. 22, 1966

3,241,460
HYDRAULIC PISTON WITH MECHANICAL
UNLOADING VALVE
Norman G. Olsen, Highland Park, Ill., assignor to Allis-Chalmers Manufacturing Company, Milwaukee, Wis.
Filed Sept. 30, 1963, Ser. No. 312,399
16 Claims. (Cl. 91—401)

This invention relates to a new piston incorporating a mechanical unloading valve.

Mechanical unloading valves have heretofore been incorporated in pistons for hydraulic jacks, however the piston and unloading valve construction has not been satisfactory in many respects. Some such piston designs take up an excessive amount of axial space thereby reducing the stroke of the jack. It is desirable to provide a two part piston when an unloading valve is included in the piston. In one such prior art piston the two piston segments are separated by an annular spacer which also serve to separate a pair of packings. This avoids the possible problem of packing hanging up on the edges of the joint between the two piston segments, however cost is increased by use of two packings rather than one and by requiring relatively thick piston segments to avoid axial deflection thereof under installed load.

It is an object of my invention to provide a piston construction of the type embodying an unloading valve means which is low in cost and occupies a minimum axial space.

It is a further object of my invention to provide a two piece piston with unloading valve means wherein the interior diameter of the single piston packing engages a smooth continuous cylindrical surface.

It is a further object of my invention to provide a piston construction of the hereinbefore mentioned character wherein the piston segments are interchangeable.

It is a further object of my invention to provide a piston with unloading valve means which minimizes close tolerance requirements, lends itself to manufacture at low cost, is easy to assemble and disassemble, gives long trouble free service and is not time consuming or expensive to service.

These and other objects and advantages of my invention will be apparent to those familiar with the are from the following description and accompanying drawings in which:

FIG. 1 is a section view of a hydraulic jack incorporating my invention;

FIG. 2 is a section view of my piston shown in FIG. 1 but with the piston at the end of its stroke showing the unloading valve in an open position;

FIG. 3 is an end view of one of the halves of my piston shown in FIGS. 1 and 2; and FIG. 4 is a section view showing a second embodiment of my invention.

Referring to FIG. 1, my novel piston 11 with unloading means 12 is incorporated in a double acting hydraulic jack 13 which includes a cylinder 14 having supply ports 16, 17 at its rod and closed ends, respectively. To reduce manufacturing cost and to minimize stocking of service parts, I make both halves 21, 22 of my piston identical. The piston segments or halves 21, 22 are separated at their inner diameter by an annular spacer 23. The piston halves 21, 22 and the spacer 23 are held in fluid tight axial engagement by releasable fastening means in the form of a piston nut 24 screwed on the threaded end 26 of piston rod 27. The piston halves 21, 22 and spacer 23 have the same diameter bore and slide easily onto reduced diameter portion 28 of rod 27, the half 21 abutting against shoulder 29 on rod 27. My piston halves carry wear or thrust bands 31, 32 in recesses 33, 34 at their outer peripheries. A packing 35 is interposed between axially spaced and radially extending surfaces 36, 37.

I provide axially inward facing recesses 38, 39 radially between surfaces 36, 37 and reduced diameter portions 41, 42, respectively, of segments 21, 22 for receiving axial ends of a cylindrical packing carrier in the form of a collar 43 having a smooth uninterrupted outer cylindrical surface 44 bearing against the inner cylindrical surface of packing 35. Fluid tight sealing between the collar 43 and the piston segments 21, 22 is insured by O-rings 46, 47 in grooves 48, 49 in the collar.

Referring also to FIG. 3, I provide axially extending bores 51, 52 and counter bores 53, 54 for receiving a plurality of abutment pins 56, 57, respectively, which serve to move the sealing rings 58, 59 out of fluid sealing seated engagement with the flat radially extending sealing faces 61, 62 when they abut against the interior end surfaces 63, 64 of the cylinder. A wave spring 65 is installed between the rings to resiliently bias the rings 58, 59 to seated engagement with faces 61, 62.

Referring to FIG. 2 the piston 11 has moved to the closed end of cylinder 14 and the plurality of pins 57 abut against surface 64 thereby moving the sealing ring 59 axially out of fluid sealing engagement with face 62. This action connects the interior cavity 66, defined by the piston halves, spacer 23 and collar 43, to the low pressure end of the cylinder. The high pressure fluid being delivered to the rod end of the cylinder will force ring 58 off its seated engagement with surface 61 and fluid will then pass from the high pressure side of the piston to the low pressure side by way of axially extending passage 71, cavity 66 and axially extending passage 72. The grooves 73, 74 are formed in the sealing faces 61, 62 to provide uniform pressure distribution and flow.

In will be noted that the axially inner end surfaces of my piston halves 21, 22 which include sealing faces 61, 62 are flat continuous surfaces thereby minimizing machining and permitting finishing of the end faces with conventional grinding equipment.

The second embodiment of my invention shown in FIG. 4 uses coil springs 101, 102 in place of the wave spring 65. Three or more coil springs may be equally spaced circumferentially in small hollow cylinders 108, 109 press fit in bores 103, 104. The cylinders 108, 109 extend through recesses 111, 112 in the sealing rings 113, 114. It is intended that the piston halves and rings are interchangeable as in the first embodiment of my invention. In my second embodiment O-rings 116, 117 are placed in the recesses 118, 119 at opposite ends of collar 121. A spacer 122 is interposed between the piston halves 106, 107 radially inwardly from the mechanical unloading valve parts. The piston rod 27 and nut 24 are of the same construction as in the first embodiment.

From the foregoing it is apparent that I have provided a compact piston of novel design. By providing identical piston segments each having an enlarged diameter portion 81 and a reduced diameter portion 41, flat surfaces 36, 37 are conveniently provided for abutment with the packing 35 and an outer cylindrical surface 83 is provided for receiving collar 43 or 121. The undercut recesses 38, 39 extending axially into the enlarged diameter portions of the piston segments are deep enough to prevent the collar from jamming thus permitting disassembly without difficulty and avoiding the necessity of close tolerances. The radially inner portions of the axially opening recesses 38, 39 are smooth continuations of the outer cylindrical surfaces of the reduced diameter portions. In the second embodiment of my invention, the collar is approximately the same length as the installed packing, and annular rings 116, 117 are installed in the recesses 118, 119 for sealing the segments relative to the collar, thus reducing the cost by eliminating the need for grooves 48, 49 and O-rings 46, 47 as shown in the collar 43 of my first embodiment, FIGS. 1 through 3.

The embodiments of the invention in which an exclusive property or privilege is claimed are defined as follows:

1. A piston adapted for installation on a piston rod and for installation in a cylinder comprising:
   a pair of axially spaced piston segments having
   confronting reduced diameter portions, respectively, terminating in flat radially extending sealfaces,
   large diameter portions on said segments, respectively, having axially confronting and radially extending surfaces, respectively, extending outwardly from said reduced diameter portions and
   an annular recess in each of said segments between said surface and said reduced diameter portion,
   a collar fitting over said reduced diameter portions thereby defining with said segments an interior cavity, radially inward from said collar,
   axially opposite ends on said collar adjacent said recesses, respectively,
   means sealing said collar relative to said piston segments,
   an annular packing axially between said surfaces and in radial engagement with the radially outer cylindrical surface of said collar,
   a plurality of fluid passages extending axially through said segments, respectively, opening into said cavity,
   a plurality of bores extending axially through said segments, respectively, opening into said cavity,
   pins in said bores and
   sealing ring means in said cavity.

2. A piston comprising:
   a pair of coaxial piston segments having reduced diameter portions presenting axially confronting sealing faces, respectively, spaced axially of one another,
   enlarged diameter portions on said segments, respectively, presenting flat surfaces extending radially outward from said reduced diameter portions,
   a rigid circumferentially continuous cylindrical collar surrounding said reduced diameter portions in sealed relation to said segments and having an outer cylindrical surface defining a smooth cylinder,
   a packing axially slidable on said collar having an inner cylindrical surface engaging the outer cylindrical surface of said collar and axially opposite end portions in axially confronting relation to said flat surfaces, respectively, and
   a mechanical unloading valve in said piston including axially shiftable fluid sealing means disposed between said faces.

3. The structure set forth in claim 2 and further comprising an annular recess formed in each of said segments between its reduced diameter portion and its flat surface.

4. The structure set forth in claim 3 and further comprising a sealing ring in each of said recesses for sealing said segments relative to said collar.

5. The structure set forth in claim 4 wherein said recesses extend axially into said enlarged diameter portions, respectively.

6. The structure set forth in claim 5 wherein said piston segments are interchangeable.

7. A piston adapted for installation on a piston rod and for installation in a cylinder comprising:
   a pair of axially spaced piston segments having
   confronting reduced diameter portions, respectively, terminating in flat radially extending sealing faces,
   large diameter portions on said segments, respectively, having axially confronting and radially extending surfaces, respectively, extending outwardly from said reduced diameter portions and
   an annular recess in each of said segments between said surface and said reduced diameter portion,
   a collar fitting over said reduced diameter portions thereby defining with said segments an interior cavity, radially inward from said collar,
   axially opposite ends on said collar adjacent said recesses, respectively,
   means sealing said collar relative to said piston segments,
   an annular packing axially between said surfaces and in radial engagement with the radially outer cylindrical surface of said collar,
   a plurality of openings extending axially through said segments, respectively, opening into said cavity,
   pins in a plurality of said openings and
   sealing ring means in said cavity.

8. The structure set forth in claim 7 wherein said means sealing said collar relative to said piston segments include O-rings disposed in said recesses.

9. The structure set forth in claim 14 wherein said recesses extend axially into said segments, respectively, and open axially in confronting relation to one another.

10. The structure set forth in claim 13 wherein said recesses extend axially into said segments, respectively, and said opposite ends of said collar extend into said recesses, respectively.

11. A piston adapted for installation on a piston rod and for installation in a cylinder comprising:
    a pair of coaxial piston segments having
    confronting reduced diameter portions, respectively,
    large diameter portions on said segments, respectively, having axially confronting and radially extending surfaces, respectively, extending outwardly from said reduced diameter portions and
    an annular recess extending axially into each of said segments between said surface and said reduced diameter portion and opening in axially confronting relation to one another, the axial extremities of said recessses being spaced axially a greater distance from the axial distance between said surfaces,
    a rigid collar fitting over said reduced diameter portions having axially opposite ends adjacent said recesses, respectively,
    means sealing said collar relative to said piston segments, and
    an annular packing axially between said surfaces and in radial engagement with the radially outer cylindrical surface of said collar, said collar having an axial length at least as great as the axial length of said packing.

12. The structure set forth in claim 11 wherein said means sealing said collar relative to said piston segments include O-rings in said recesses, respectively.

13. The structure set forth in claim 11 wherein said ends of said collar extend axially into said recesses, respectively, without abutting the ends of the latter.

14. A piston comprising:
    a pair of coaxial piston segments having
    reduced diameter portions in axially confronting relation to one another, and
    enlarged diameter portions on said segments, respectively, presenting flat surfaces extending radially outward from said reduced diameter portions,
    a rigid circumferentially continuous cylindrical collar surrounding said reduced diameter portions in sealed relation to said segments and having an outer cylindrical surface defining a smooth cylinder,
    a packing axially slidable on said collar having an inner cylindrical surface engaging the outer cylindrical surface of said collar and axially opposite end portions engaging said flat surfaces, respectively, and
    a mechanical unloading valve in said piston including axially shiftable fluid sealing means disposed radially inwardly from said collar.

15. The structure set forth in claim 14 and further comprising an annular recess formed in each said segment between its reduced diameter portion and its flat surface.

16. The structure set forth in claim 15 and further comprising a sealing ring in each of said recesses for sealing said segments relative to said collar.

References Cited by the Examiner

UNITED STATES PATENTS

| | | | |
|---|---|---|---|
| 50,855 | 11/1865 | Tannock | 92—257 |
| 847,455 | 3/1907 | Ballard | 92—250 |
| 940,068 | 11/1909 | Robinson | 92—258 |
| 1,557,720 | 10/1925 | Mueller | 92—250 |
| 1,569,560 | 1/1926 | Miller | 92—85 |
| 3,059,622 | 10/1962 | Sexauer | 91—401 |

FOREIGN PATENTS 1,125,999  7/1956  France.

SAMUEL LEVINE, *Primary Examiner.*

FRED E. ENGELTHALER, *Examiner.*

P. E. MASLOUSKY, *Assistant Examiner.*